United States Patent [19]
Cordes

[11] Patent Number: 5,831,724
[45] Date of Patent: Nov. 3, 1998

[54] IMAGING LIDAR-BASED AIM VERIFICATION METHOD AND SYSTEM

[75] Inventor: Brett Cordes, Panama City Beach, Fla.

[73] Assignee: The United States of America as represented by the Secretary of the Navy, Washington, D.C.

[21] Appl. No.: 898,361

[22] Filed: Jul. 22, 1997

[51] Int. Cl.[6] .............................. G01B 11/26; B63G 7/02
[52] U.S. Cl. ....................... 356/141.1; 89/1.11; 89/1.13; 89/41.06
[58] Field of Search .......................... 342/67; 356/141.1; 89/1.11, 1.13, 41.06

[56] References Cited

U.S. PATENT DOCUMENTS

| | | | |
|---|---|---|---|
| 5,208,417 | 5/1993 | Langer et al. | 89/41.06 |
| 5,249,501 | 10/1993 | Waldman et al. | 89/41.06 |
| 5,345,304 | 9/1994 | Allen | 356/5 |
| 5,448,936 | 9/1995 | Turner | 89/1.13 |
| 5,638,164 | 6/1997 | Landau | 356/5.01 |

*Primary Examiner*—Mark Hellner
*Attorney, Agent, or Firm*—Harvey A. Gilbert; Kenneth W. Dobyns

[57] ABSTRACT

An aim verification method and system utilize an imaging lidar that transmits a first beam of radiation within the imaging lidar's field of view. Reflected backscattered energy associated with the first beam within the field of view increases in an area thereof when a target is present therein. A radiation source is coupled to a gun and transmits a second beam of radiation in line with the aimpoint of the gun towards the area of increased reflected backscattered energy associated with the first beam. The second beam has a greater energy density than the first beam and has a cross-section that is smaller than the target. An energy detector is used to sense the reflected backscattered energy associated with the second beam. The gun is aimed at the target when the reflected backscattered energy associated with the second beam is greatest in the area of the field of view of increased reflected backscattered energy associated with the first beam.

23 Claims, 3 Drawing Sheets

IMAGING LIDAR-BASED AIM VERIFICATION METHOD AND SYSTEM

ORIGIN OF THE INVENTION

The invention described herein was made in the performance of official duties by an employee of the Department of the Navy and may be manufactured, used, licensed by or for the Government for any governmental purpose without payment of any royalties thereon.

FIELD OF THE INVENTION

The invention relates generally to the targeting of objects, and more particularly to a method and system of verifying the aim of a gun utilizing an imaging lidar.

BACKGROUND OF THE INVENTION

Imaging lidar ("light detecting and ranging") mine reconnaissance systems are typically flown onboard aircraft to provide images of targets such as mines as well as the surrounding water column. It would be desirable to use the reconnaissance system to direct a neutralization device to the target. Such neutralization devices include remotely operated vehicles, small torpedo-like explosive devices, or guns. In the case of guns, alignment is required between the imaging sensor and the gun barrel.

The alignment of a gun using an imaging lidar can be difficult due to the offset between the gun and the imaging lidar sensor as well as the variable distance from the sensor platform to the target. The current angular tolerances in imaging lidar leads to errors which may create a clean-miss situation for a gun. Due to the expense of special water penetrating rounds, minimizing misses is a priority.

SUMMARY OF THE INVENTION

Accordingly, it is an object of the present invention to provide a system and method for verifying the aim between an airborne gun and an underwater target.

Another object of the present invention is to provide a system and method for verifying the aim of an airborne gun firing a water-penetrating round.

Still another object of the present invention to provide a system and method of aim verification for a gun where such aim verification utilizes an existing reconnaissance lidar system.

Other objects and advantages of the present invention will become more obvious hereinafter in the specification and drawings.

In accordance with the present invention, an aim verification method and system are provided. An imaging lidar, having a field of view that is larger than a target of interest, transmits a first beam of radiation within the field of view. Reflected backscattered energy associated with the first beam is generated within the field of view and increases in an area thereof when the target is present therein. A radiation source is coupled to a gun and transmits a second beam of radiation in line with the aimpoint of the gun towards the area of increased reflected backscattered energy associated with the first beam. The second beam has a greater energy density than the first beam and has a cross-section that is smaller than the target. An energy detector is used to sense the reflected backscattered energy associated with the second beam. The gun is aimed at the target when the reflected backscattered energy associated with the second beam is greatest in the area of the field of view of increased reflected backscattered energy associated with the first beam. The wavelengths of the first and second beams can be the same or different. The energy detector can be the same one used by the imaging lidar or could be a separate detector mounted on the gun.

BRIEF DESCRIPTION OF THE DRAWINGS

Other objects, features and advantages of the present invention will become apparent upon reference to the following description of the preferred embodiments and to the drawings, wherein corresponding reference characters indicate corresponding parts throughout the several views of the drawings and wherein.

DETAILED DESCRIPTION OF THE INVENTION

Figure 1:
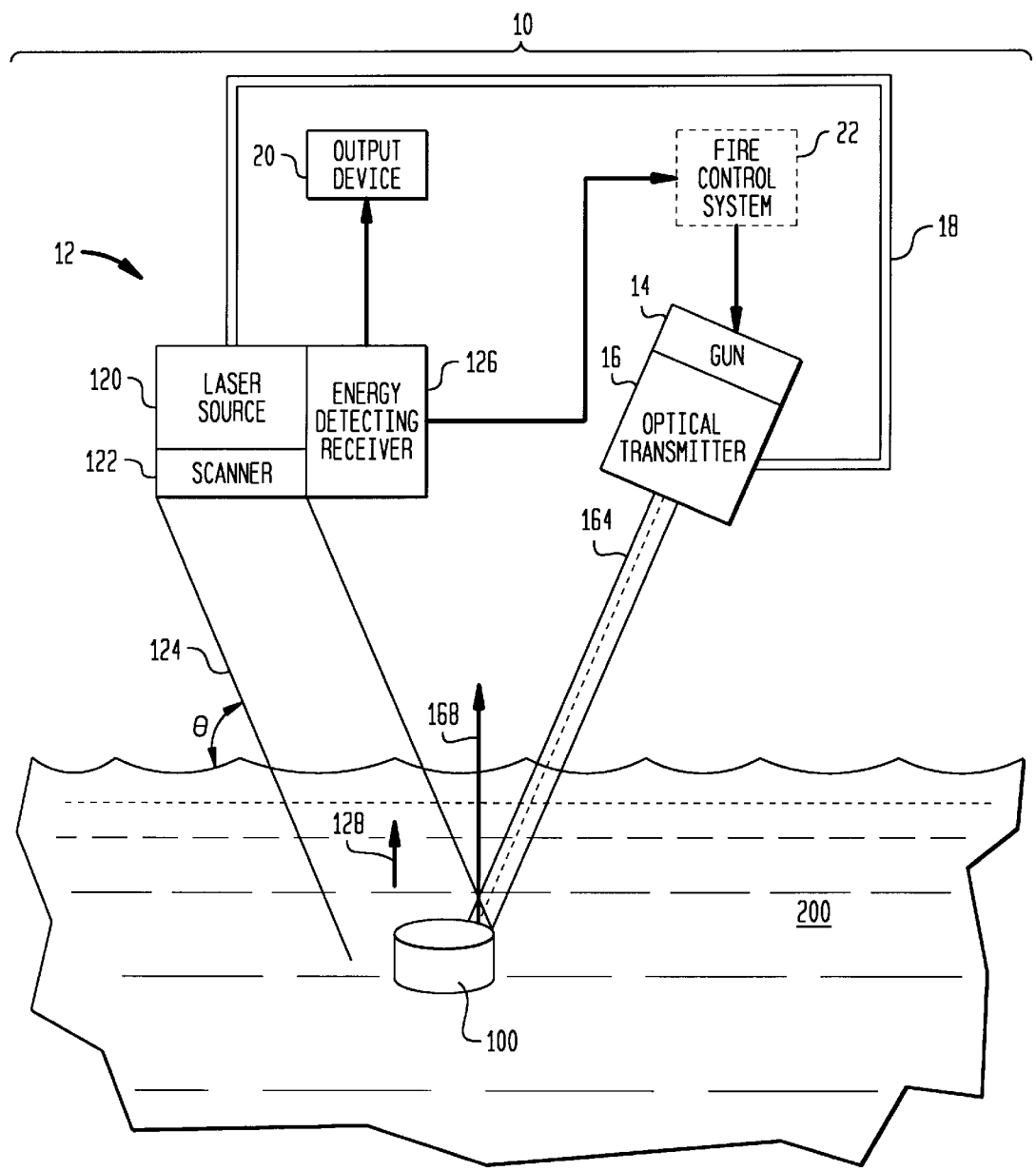
FIG. 1 is a schematic view of an imaging-lidar based aim verification system according to the present invention.

Referring now to the drawings, and more particularly to FIG. 1, a schematic view of an imaging lidar-based aim verification system is shown and referenced generally by numeral 10. By way of example, system 10 will be described as airborne system used to target a mine 100 located in water 200. However, it is to be understood that mine 100 is representative of any object to be detected and water 200 is representative of any medium (including air) in which the object resides.

Aim verification system 10 includes an imaging lidar 12 mounted on an airborne platform such as a helicopter (not shown) that is flown over the surface of water 200. In general, an imaging lidar uses a laser pulse to range and illuminate an underwater object. A receiver, generally comprising an array of detectors, forms an image plane view of the laser reflections at any given instant of time. If no object (e.g., mine) is present, the return is only due to the water volume. The return is in the form of reflected backscattered energy detected by the imaging lidar's receiver. If a mine is present, then either a reflection of the mine or a shadow of the mine is returned to the receiver. One type of receiver uses a time resolved detector array. Another type of receiver uses a time-gated intensified charge coupled device (ICCD). Regardless of the type of imaging lidar, an image is produced showing areas of water and target returns. A series of these images are then produced over an area where mines are thought to exist.

Accordingly, imaging lidar 12 includes a laser source 120 that produces laser pulses, a scanner 122 transmitting the laser pulses as an imaging laser beam 124, and an energy detecting receiver 126 sensitive to a specified spectral response. Such imaging lidar systems are known in the art and will therefore not be discussed in detail herein. Examples of such imaging lidar systems include the "Magic Lantern" system from Kaman Aerospace Corporation, and the ATD-111 system from Lockheed-Martin Corporation.

Imaging laser beam 124 is typically a spread beam that defines or is within the field of view of receiver 126. Due to reflection characteristics of the surface of water 200, the angle of entry θ that imaging laser beam 124 makes with the surface of water 200 is preferably between approximately 60° and 90°. While smaller angles of θ can be used with imaging lidar 12, receiver 126 would have to compensate for increased photon loss due to reflection away from receiver 126.

Since aim verification system 10 is typically used to target mine 100 for neutralization, a gun 14 is mounted on the airborne platform supporting imaging lidar 12. For the illustrated example, it is assumed gun 14 is capable of firing a water-penetrating round into water 200. Gun 14 has an aimpoint referenced in FIG. 1 by dashed line 15. Aimpoint dashed line 15 defines the direction along which a round will travel when fired from gun 14. Mounted on gun 14 is an optical transmitter 16 (e.g., beam projection optics or scanner) that is configured to direct a targeting beam 164 in line with dashed line aimpoint 15. In the illustrated example, optical energy is supplied to optical transmitter 16 from laser source 120. For example, an optical waveguide 18 can be used to couple laser pulses from laser source 120 to optical transmitter 16. This can be accomplished by dividing the energy of the laser pulses produced by laser source 120, or by having alternative laser pulses fed to scanner 122 and optical transmitter 16. In either case, optical transmitter 16 outputs targeting beam 164 with a diameter or cross-section that is smaller than mine 100. In addition, the energy density of targeting beam 164 is greater than the energy density of imaging beam 124. This condition can be achieved with the same laser pulses used to generate imaging beam 124 since targeting beam 164 is typically considerably smaller than imaging beam 124.

In operation, imaging beam 124 causes reflected backscattered energy, referenced by arrow 128, to be generated in water 200 as it is scanned thereacross. Receiver 126 detects energy 128 and uses same to form an image plane view within the receiver's field of view that can be monitored, archived, or otherwise used, at an output device 20. When imaging beam 124 contacts mine 100, energy 128 increases in an area of the image plane indicative of the position of mine 100 within the particular field of view of receiver 126. Optical transmitter 16 is then directed manually or by an automatic control system via movement of gun 14 to transmit targeting beam 164 toward the area in the field of view where energy 128 is increased. The higher energy density of target beam 164 causes the greatest return of reflected backscattered energy, referenced by arrow 168, when targeting beam 164 strikes mine 100. The increased level of energy 168 (added to the target signature reflected in energy 128 when imaging beam 124 and targeting beam 164 are the same wavelength) can be used to verify alignment of gun 14 with mine 100. When both imaging beam 124 and targeting beam 164 utilize laser source 120 (ie., both beams are at the same wavelength), detection of energy 128 and 168 can be accomplished with receiver 126. Firing of gun 14 can then be accomplished manually or by means of a fire control system 22 (the optional nature thereof being indicated by its dashed-line representation in FIG. 1) coupled between receiver 126 and gun 14. Fire control system 22 could be supplied with a threshold energy level that must be surpassed by the combination of energy 128 and 168 returns before gun 14 can be fired.

The advantages of the present invention are numerous. The aim verification system increases the certainty that a target of interest is present and simultaneously can be used to align a gun with the target. In terms of mine neutralization, this reduces the chances of missing the target and therefore minimizes the number of water-penetrating rounds that must be fired from an airborne reconnaissance platform.

Figure 2:
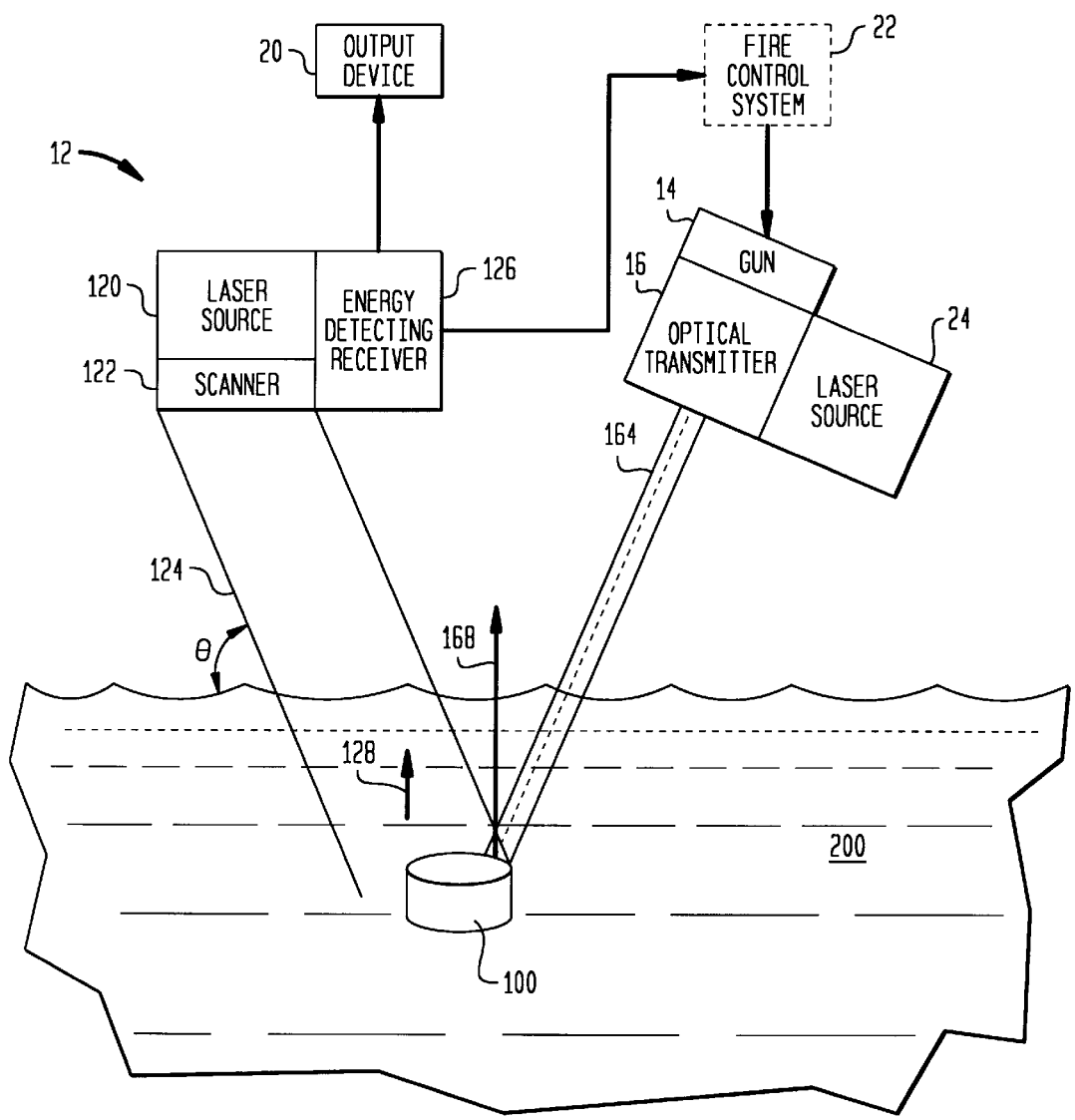
FIG. 2 is a schematic view of an alternative-embodiment aim verification system according to the present invention.
Figure 3:
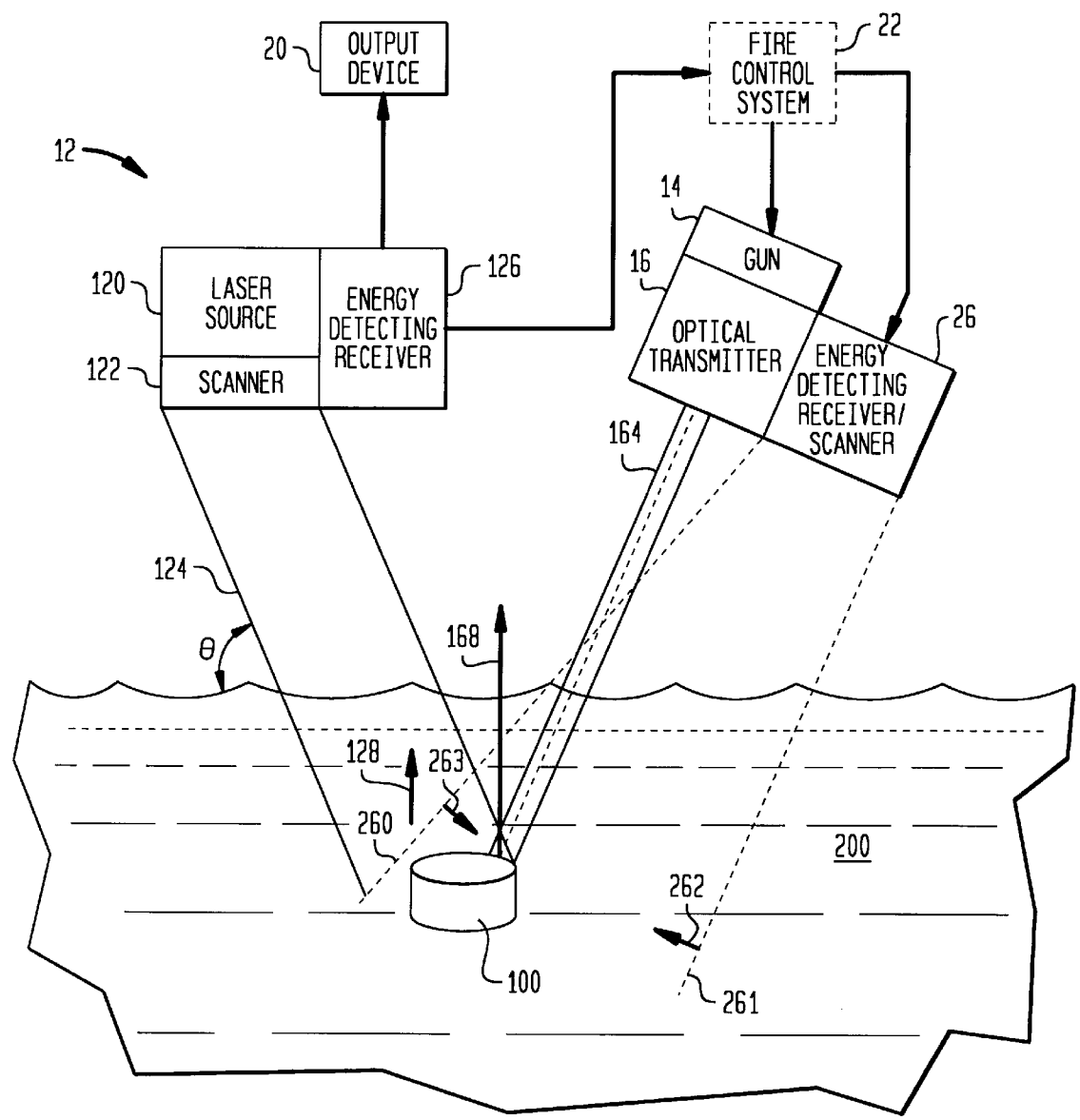
FIG. 3 is a schematic view of another alternative-embodiment aim verification system according to the present invention.

Although the invention has been described relative to a specific embodiment thereof, there are numerous variations and modifications that will be readily apparent to those skilled in the art in light of the above teachings. For example, as shown in FIG. 2, optical transmitter 16 could receive optical energy from a second laser source 24 coupled thereto. Laser source 24 could produce laser pulses at the same or different wavelength with respect to those produced by laser source 120. However, if laser source 24 produces pulses of a different wavelength, receiver 126 must be sensitive to the spectral responses generated at both wavelengths. Another embodiment is shown in FIG. 3 where an energy detecting receiver/scanner 26 is mounted on gun 14 and is sensitive to the spectral response generated by targeting beam 164. Receiver/scanner 26 has an adjustable field of view that is defined initially between dashed lines 260 and 261 (e.g., commensurate with the field of view of receiver 126) and is reduced in size as indicated by arrows 262 and 263 to focus on where energy 168 is greatest. Synchronization of receiver/scanner 26 with the laser pulses generated by laser source 120 could be provided via fire control system 22. The two-laser source approach shown in FIG. 3 could produce imaging beam 124 and targeting beam 164 simultaneously or in an alternating fashion. It is therefore to be understood that, within the scope of the appended claims, the invention may be practiced other than as specifically described.

What is claimed as new and desired to be secured by Letters Patent of the United States is:

1. An aim verification system comprising:
   an imaging lidar having a field of view that is larger than a target of interest, said imaging lidar transmitting a first beam of radiation within said field of view, wherein reflected backscattered energy associated with said first beam is generated within said field of view and wherein said reflected backscattered energy associated with said first beam increases in an area of said field of view when said target is present in said field of view;
   a gun having an aimpoint;
   a radiation source coupled to said gun for transmitting a second beam of radiation in line with said aimpoint of said gun towards said area, said second beam having a cross-section that is smaller than said target, said second beam having a greater energy density than said first beam; and
   an energy detector for sensing reflected backscattered energy associated with said second beam wherein said gun is aimed at said target when said reflected backscattered energy associated with said second beam is greatest in said area of said field of view.

2. A system as in claim 1 wherein said first beam and said second beam are of the same wavelength.

3. A system as in claim 1 wherein said first beam and said second beam are of different wavelengths.

4. A system as in claim 1 wherein said imaging lidar includes an optical energy source for generating optical energy, and wherein said radiation source comprises:
   said optical energy source; and
   an optical transmitter coupled to said optical energy source for directing said optical energy as said second beam of radiation transmitted in line with said aimpoint of said gun.

5. A system as in claim 1 wherein said energy detector is included in said imaging lidar.

6. A system as in claim 1 wherein said energy detector is mounted on said gun.

7. A system as in claim 6 wherein said energy detector has an adjustable field of view.

8. An airborne system for targeting a mine located in water, comprising:

an imaging lidar having a field of view that is larger than the mine, said imaging lidar transmitting a first laser beam within said field of view through the air to the water at an angle of between approximately 60° and 90° with respect to the surface of the water, wherein reflected backscattered energy is generated as said first laser beam passes through the water, said reflected backscattered energy being increased within said field of view when said first laser beam impinges on the mine;

a gun for firing a water-penetrating round, said gun having an aimpoint;

a laser source coupled to said gun for transmitting a second laser beam in line with said aimpoint of said gun at an angle of between approximately 60° and 90° with respect to the surface of the water, said second laser beam having a cross-section that is smaller than the mine, said second laser beam having a greater energy density than said first laser beam, said laser source directing said second laser beam to an area within said field of view where said reflected backscattered energy generated by said first laser beam is increased; and an energy detector for sensing reflected backscattered energy generated by said second laser beam, wherein said gun is aimed at the mine when said reflected backscattered energy generated by said second laser beam is greatest in said area of said field of view.

9. An airborne system as in claim 8 wherein said first laser beam and said second laser beam are of the same wavelength.

10. An airborne system as in claim 8 wherein said first laser beam and said second laser beam are of different wavelengths.

11. An airborne system as in claim 8 wherein said imaging lidar generates laser pulses used to form said first laser beam, and wherein said laser source comprises:

an optical waveguide coupled to said imaging lidar for transmitting said laser pulses to said gun; and an optical transmitter mounted on said gun and coupled to said optical waveguide for transmitting said laser pulses as said second laser beam in line with said aimpoint of said gun.

12. An airborne system as in claim 8 wherein said energy detector is included in said imaging lidar.

13. An airborne system as in claim 8 wherein said energy detector is mounted on said gun.

14. An airborne system as in claim 13 wherein said energy detector has an adjustable field of view.

15. A method of verifying the aim of a gun located in air at a target located in water, comprising the steps of:

scanning an imaging beam of radiation from an imaging lidar across the water, said imaging beam defining a field of view of said imaging lidar that is larger than the target;

detecting reflected backscattered energy that is generated as said imaging beam passes through the water, wherein said reflected backscattered energy generated by said imaging beam increases in an area of said field of view when the target is present in said field of view;

transmitting a targeting beam of radiation in line with an aimpoint of the gun to said area of said field of view, said targeting beam having a cross-section that is smaller than the target, said targeting beam having a greater energy density than said imaging beam; and sensing reflected backscattered energy generated by said targeting beam, wherein the gun is aimed at the target when said reflected backscattered energy generated by said targeting beam is greatest in said area of said field of view.

16. A method according to claim 15 wherein said imaging beam and said targeting beam are of the same wavelength.

17. A method according to claim 15 wherein said imaging beam and said targeting beam are of different wavelengths.

18. A method according to claim 15 wherein said step of scanning includes the step of generating laser pulses to form said first laser beam, and wherein said step of transmitting comprises the steps of:

relaying a portion of said laser pulses to an optical transmitter mounted on said gun; and aligning said optical transmitter such that said portion of said laser pulses are transmitted as said second laser beam in line with said aimpoint of said gun.

19. A method according to claim 15 wherein said step of sensing is accomplished by said imaging lidar.

20. A method according to claim 15 wherein said step of sensing is accomplished by an energy detector mounted on said gun.

21. A method according to claim 20 wherein said step of sensing includes the step of adjusting a field of view of said energy detector to focus on said area of said field of view.

22. A method according to claim 15 wherein said step of scanning includes the step of directing said imaging beam within said field of view through the air to the water at an angle of between approximately 60° and 90° with respect to the surface of the water.

23. A method according to claim 15 wherein said step of transmitting includes the step of directing said targeting beam through the air to the water at an angle of between approximately 60° and 90° with respect to the surface of the water.

* * * * *